United States Patent [19]

Fukushima et al.

[11] Patent Number: 4,555,690
[45] Date of Patent: Nov. 26, 1985

[54] WARNING SIGNAL GENERATING DEVICE FOR VEHICLE

[75] Inventors: Yoneharu Fukushima; Kiyoshi Wakai, both of Nagano, Japan

[73] Assignee: Kabushiki Kaisha Sankyo Seiki Seisakusho, Nagano, Japan

[21] Appl. No.: 335,492

[22] Filed: Dec. 30, 1981

[30] Foreign Application Priority Data

Dec. 30, 1980 [JP] Japan ................ 55-188149

[51] Int. Cl.$^4$ ............................................. B60Q 1/00
[52] U.S. Cl. .................. 340/52 F; 340/52 D; 340/329
[58] Field of Search ............... 340/52 D, 52 E, 52 F, 340/384 E, 384 R, 393, 517, 521, 522, 328, 329

[56] References Cited

U.S. PATENT DOCUMENTS

| | | |
|---|---|---|
| 3,683,346 | 8/1972 | Horton ................ 340/328 |
| 4,031,527 | 6/1977 | Yanagishima ........ 340/52 F |
| 4,187,670 | 2/1980 | Okano ................. 340/384 E |
| 4,193,060 | 3/1980 | Slavin ................. 340/52 D |
| 4,195,285 | 3/1980 | Bukala ................ 340/52 F |
| 4,353,055 | 10/1982 | Kawakatsu ......... 340/52 D |

Primary Examiner—John W. Caldwell, Sr.
Assistant Examiner—Michael F. Heim
Attorney, Agent, or Firm—Sughrue, Mion, Zinn, Macpeak & Seas

[57] ABSTRACT

An oscillator and frequency divider provide a plurality of different frequency signals in response to any indication of vehicle abnormality. A plurality of switches indicate vehicle status such as a door, ignition and the like. A gate circuit having a plurality of gates passes one of said frequency signals at any one time in response to the particular vehicle abnormality indicated by a control circuit responsive to the switches. An alarm signal is generated having a frequency that is a function of the signal passed through the gate circuit.

12 Claims, 5 Drawing Figures

WARNING SIGNAL GENERATING DEVICE FOR VEHICLE

BACKGROUND OF THE INVENTION

This invention relates to a warning signal generating device for a vehicle, which generates a warning signal to warn the user or operator of negligence in using a seat belt, negligence in removing a key, negligence in turning off a vehicle light, or an excessively high vehicle speed.

In general, a vehicle has a variety of warning signal generating devices, in which different mechanical sound generating elements are used for generating different warning sounds. Therefore, in the conventional devices, the warning sounds may have unsatisfactory tones. Furthermore, the conventional devices need a special timer circuit for controlling the warning sound generating time. Thus, the conventional devices are high in manufacturing cost and are liable to become bulky.

SUMMARY OF THE INVENTION

Accordingly, an object of this invention is to eliminate the above-described difficulties accompanying a conventional warning signal generating device, and more specifically to provide a warning signal generating device which is simple in construction and is operated electrically.

In order to achieve the foregoing object, in this invention, a plurality of different waveform signals are obtained from an oscillation frequency division circuit, and the waveform signals are combined with control signals provided respectively for different objects to be controlled in a gate circuit, so that one and the same alarm unit is caused to generate different warning signals, e.g. different in frequency of occurrence, and the warning signal generating condition of the alarm unit is stopped or changed by a timer signal which is produced by the oscillation frequency division circuit in a predetermined period of time.

BRIEF DESCRIPTION OF THE DRAWINGS

Embodiments of this invention will be described with reference to the accompanying drawings, in which.

DETAILED DESCRIPTION OF THE INVENTION

Figure 1:
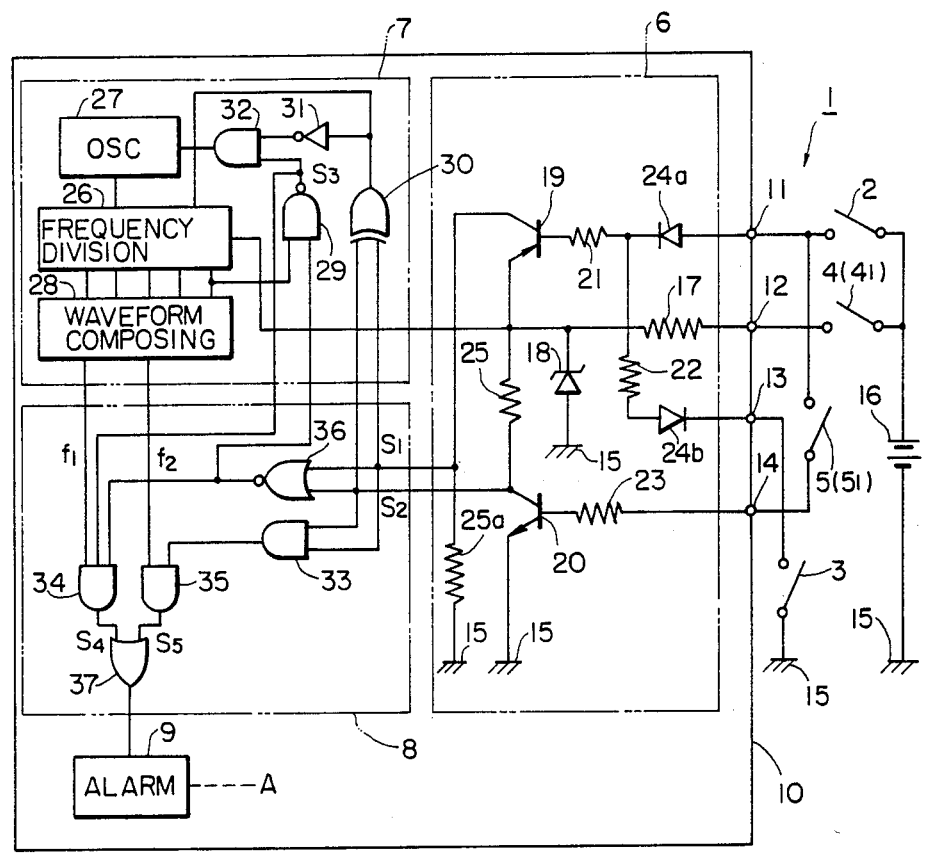
FIG. 1 is a circuit diagram showing one example of a warning signal generating device for a vehicle according to this invention.

FIG. 1 shows one embodiment of the invention for preventing negligence in buckling a seat belt and negligence in removing an engine key. A warning signal generating device 1 for a vehicle according to this embodiment comprises: an ignition switch 2, a door switch 3, a negligence preventing switch 4, a detecting means 5, a control circuit 6, an oscillation frequency division circuit 7, a gate circuit 8 and an alarm unit 9.

The ignition switch 2 is turned on when the vehicle engine key is turned on. An input terminal 11 of a circuit unit 10 is connected to the ignition switch 2, which is connected through an electric source 16 to ground at 15. The door switch 3 is to detect whether a vehicle door is open or not. The door switch 3 is closed when the door is open. The door switch 3 is connected between an input terminal 13 of the circuit unit 10 and ground 15. The negligence preventing switch 4 is to detect the status of a vehicle component, such as the insertion of an engine key. The switch 4 is, for instance, a key switch 4, which is closed when the engine key is inserted. The switch 4 is connected between an input terminal 12 of the circuit unit 10 and the positive terminal of the electric source 16. The detecting means 5 is seat belt switch $5_1$ which, under the condition that the ignition switch 2 is turned on, detects the fact that a seat belt is not buckled, or that the user has forgotten to wear the seat belt. The seat belt switch $5_1$ is turned on when the user does not wear the seat belt. The switch $5_1$ is connected between the input terminal 11 and an input terminal 14.

When, under the condition that the ignition switch 2 is turned on, the detecting means 5 (or the seat belt switch $5_1$) detects the fact that the object to be detected is in an abnormal state, the control circuit 6 provides a first control signal $S_1$. When the door switch 3 detects the fact that the door is open and the key switch $4_1$ detects that fact that the user has forgotten to remove the engine key, the control circuit 6 provides a second control signal $S_2$.

In the control circuit 6, one terminal of a resistor 16 is connected to the input terminal 12, and the other terminal of the resistor 17 is connected to the cathode of a Zener diode 18 for constant voltage, the anode of which is connected to ground 15. The cathode of the Zener diode 18 is connected to the emitter of a PNP type switching transistor 19 the collector of which is connected through a resistor 25a to ground 15. The cathode of the Zener diode 18 is further connected through a resistor 25 to the collector of an NPN type switching transistor 20, the emitter of which is grounded.

The base of the transistor 19 is connected through a resistor 21 and backward through a diode 24a to the input terminal 11. The connecting point between the resistor 21 and the diode 24a is connected through a resistor 22 and a diode 24b to the input terminal 13. The base of the transistor 20 is connected through a resistor 23 to the input terminal 14. The aforementioned first and second control signals $S_1$ and $S_2$ are provided at the collectors of the transistors 19 and 20, respectively.

The oscillation frequency division circuit 7 produces first and second waveform signals $f_1$ and $f_2$ from different frequency division stages and generates a timer signal $S_3$ in a predetermined period of time. In the circuit 7, a frequency division circuit 26, which is of a well known type, is connected to the cathode of the Zener diode 18. An oscillator 27 and a waveform composing circuit 28, also of a well known type, are connected to the input and output of the frequency division circuit 26, respectively. The oscillation frequency division circuit 7 further comprises a NAND gate 29 for setting a delay time, an EXCLUSIVE OR gate 30 for resetting, an inverter 31 and an AND gate 32. The NAND gate 29 receives an output from the last output stage in the frequency division circuit 26 and a signal from a part of the gate circuit 8 (described later), and the output of the NAND gate 29 is applied to the AND gate 32. The two input terminals of the EXCUSIVE OR gate 30 are connected to the collectors of the aforementioned transistors 19 and 20. The output of the EXCLUSIVE OR gate 30 is connected to the reset terminal of the frequency division circuit 26, and is connected through the inverter 31 and the AND gate 32 to the oscillator 27.

In response to the aforementioned time signal $S_3$, the gate circuit 8 supplies a first drive signal $S_4$ obtained by combining the first control signal $S_1$ and the first waveform signal $f_1$, or a second drive signal $S_5$ obtained by combining the second control signal $S_2$ and the second waveform signal $f_2$, for the predetermined delay time. The gate circuit 8 comprises AND gates 33, 34 and 35, a NOR gate 36 and an OR gate 37 in combination. The NOR gate and the AND gate 33 are each connected to the collectors of the transistors 19 and 20. The output of the NOR gate 36 is connected to one input terminal of the NAND gate 29 in the oscillation frequency division circuit 7 and to one input terminal of the AND gate 34. The output of the AND gate 33 is connected to one input terminal of the AND gate 35. The AND gates 34 and 35 receive the first and second waveform signals $f_1$ and $f_2$, respectively, from the output terminals of the waveform combining circuit 28, and output the first and second drive signals $S_4$ and $S_5$, respectively, which are applied through the OR gate 37 to the alarm unit 9. The alarm unit 9 is a sound generating element such as a piezo-electric element, which generates different warning sounds A in accordance with the first and second drive signals $S_4$ and $S_5$.

Figure 2:
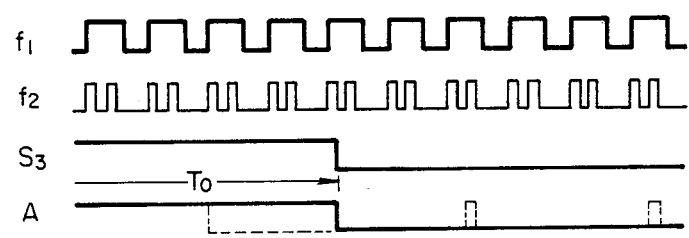
FIG. 2 is a waveform diagram for a description of the operation of the circuit in FIG. 1.

The operation of the warning signal generating device will be described with reference to a time chart in FIG. 2.

When the vehicle's key is inserted and the vehicle is operated under the condition that the seat belt is not fastened to the user (or operator), then the ignition switch 2, the key switch $4_1$ and the seat belt switch $5_1$ are all closed, and power necessary for the operation of the frequency division circuit 26 is supplied from the electric source 16. Under this condition, a high voltage is applied through the ignition switch 2 to the base of the transistor 19, so that the latter 19 is rendered non-conductive (off). Furthermore, a high voltage is applied through the ignition switch 2 and the seat belt switch $5_1$ to the base of the transistor 20, so that the latter 20 is rendered conductive (on). As a result, the collector outputs of the transistors 19 and 20 are at a low logical level (hereinafter referred to merely as an "L" level); that is, the otuputs of the control circuit 6 are at the "L" level. The two "L" level outputs are applied as the first control signals $S_1$ to the gate circuit 8. The EXCLUSIVE OR circuit 30 in the oscillation frequency division circuit 7, receiving the two "L" level outputs, outputs an "L" level signal, which is converted into a signal at a high logical level (hereinafter referred to merely as an "H" level) by the inverter 31. The "H" level signal is applied to one input terminal of the AND gate 32.

An "L" level signal at the last stage output of the frequency division circuit 26 and the "H" level output of the NOR gate 36 are applied to the NAND gate 29, and therefore the latter 29 provides an "H" level output which is applied to the other input terminal of the AND gate 32. Thus, the AND gate 32 provides an "H" level output to start oscillation. That is, the oscillator 27 and the frequency division circuit 26 start their operation, and accordingly the waveform combining circuit 28 continuously outputs the first and second waveform signals $f_1$ and $f_2$. On the other hand, the NOR gate 36 in the gate circuit 8, receiving the low level first control signals $S_1$, outputs an "H" level signal which is applied to the AND gate 34. Thus, when three inputs to the AND gate 34 are at the "H" level, the AND gate 34 outputs the first drive signal $S_4$, which is applied through the OR gate 37 to the alarm unit 9. In this case, the alarm unit 9 generates a warning sound A in accordance with the frequency of the first waveform signal $f_1$.

If the user subsequently wears the seat belt, the seat belt switch $5_1$ is turned off and the collector output of the transistor 20 is raised to the "H" level, and accordingly the "L" level output from gate 30 due to the two "L" level first control signals $S_1$ disappears, whereupon the operation of the oscillator 27 is stopped and the warning sound A from the alarm unit 9 is also stopped as indicated by the broken line in FIG. 2. At the same time, the oscillation frequency division circuit 26 is reset by the "H" level signal from the EXCLUSIVE OR gate 30.

If the user does not wear the seat belt although the warning sound is being generated, the warning sound is nevertheless stopped after a predetermined delay time. That is, when a predetermined delay time $T_O$ passes while the "L" level first control signal $S_1$ is still being provided, the frequency division circuit 26 eventually provides an "H" level frequency division output at its last stage output, which is applied to the NAND gate 29. This "H" level output provided at the last stage output, and the "H" level output of the NOR gate 36, are both received by the NAND gate 29, and the latter 29 then applies an "L" level time signal $S_3$ to one input terminal of the AND gate 32. Even though the "H" level output of the inverter 31 is still applied to the other input terminal of the AND gate 32, and "L" level timer signal $S_3$ is supplied to the oscillator 27. Consequently, the oscillation of the oscillator 27 is suspended, so that the generation of the warning sound A is stopped. Since the "L" level output of the NAND gate 29 is applied to one input terminal of the AND gate 34, the warning sound A is positively stopped. The delay time $T_O$ can be changed as desired by changing the frequency division stage in the frequency division circuit 26 from which the other input to the gate 29 is taken.

In the case when the user leaves the vehicles by opening the door with the key left in the ignition but turned off, the door switch 3 and the key switch $4_1$ are closed. In this case, since a base current flows through the resistors 21 and 22, the diode 24b and the door switch, the transistor 19 is rendered conductive. Since the ignition switch 2 is turned off, the other transistor 20 is in an "off" state. Therefore, the transistors 19 and 20 output "H" level signals, that is, the "H" level second control signals $S_2$ are provided. Both of these second control signals $S_2$ are applied to the EXCLUSIVE OR circuit 30, and therefore an "L" level output is provided by the latter 30. Accordingly, the oscillator 27 is started by the "H" level signal. On the other hand, the second control signals $S_2$ are applied to the AND gate 33, and therefore the latter 33 supplies an "H" level output to one input terminal of the AND gate 35. Thus, the AND gate 35, receiving the second waveform signal $f_2$ and the "H" level output of the AND gate 33, applies the second drive signal $S_5$ to the alarm unit 9. Therefore, the alarm unit 9 generates a second warning sound A in accordance with the frequency of the second waveform signal $f_2$, which is different in frequency from the above-described first warning sound A. This new warning sound A is continuously generated until the key switch $4_1$ is turned off, i.e., until the engine key is removed.

In other cases, i.e. with no detected abnormality, the control circuit 6 provides an "H" level output and an "L" level output. Therefore, the AND gates 34 and 35 in the gate circuit 8 are not opened, and the EXCLUSIVE OR gate 30 applies an "H" level signal to the frequency division circuit 26 to reset the latter 26. The "H" level signal of the EXCLUSIVE OR gate 30 is also converted into an "L" level signal by the inverter 31, which is applied to the oscillator 27 to stop the latter 27.

The alarm sound A produced in response to the signals $f_1$ and $f_2$ may very in any number of ways. For example, the sound may be of constant tone with the duty cycle varying between the different signals so that signal $f_1$ would produce beeps of approximately 50% duty cycle while signal $f_2$ would produce pairs of short beeps. If the alarm is visual, the flashing frequency could be varied in the same manner. Alternatively, a different tone may be produced in response to the different signals $f_1$ and $f_2$. For purposes of the above and following descriptions, it will be assumed that only the duty cycle and periodicity of the visual or audio alarm is varied, i.e. in the case of an audio alarm the tone is always the same but the frequency and duration of the tone bursts is varied. However, it should be emphasized that this is by way of example only and the invention is not limited thereto.

Figure 3:
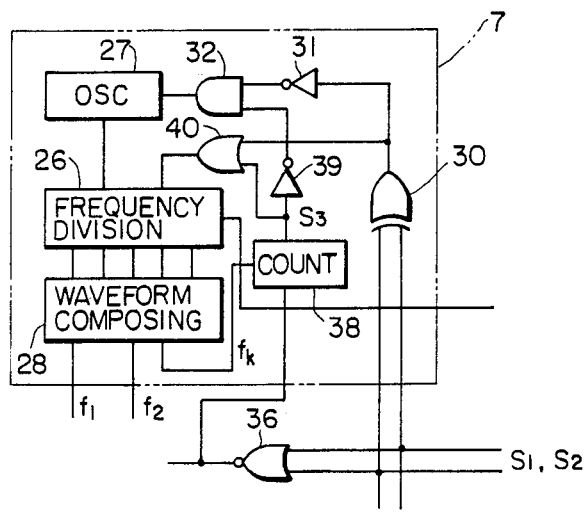
FIG. 3 is a circuit diagram showing another example of the gate circuit in FIG. 1.

FIG. 3 shows another example of the timer signal $S_3$ generating means. In the circuit shown in FIG. 3, the timer signal $S_3$ is provided by a counter circuit 38. The counter circuit 38 starts counting in response to the output of the NOR gate 36 in the gate circuit 8, to count a waveform signal $f_k$ from a waveform combining circuit 28. When the count value of the counter circuit 38 reaches a predetermined value, the counter circuit 38 produces an "H" level timer signal $S_3$. The timer signal $S_3$ is applied through an OR gate 40 to a frequency division circuit 26 to reset the latter 26. The timer signal $S_3$ is further applied through an inverter 39 and an AND gate 32 to the oscillator 27, that is, an "L" level signal is applied to stop the latter 27. Since the count value of the counter circuit 38 can be set as desired, the time instant of generation of the timer signal $S_3$, i.e., the delay time $T_O$ can be selected as desired.

Figure 4:
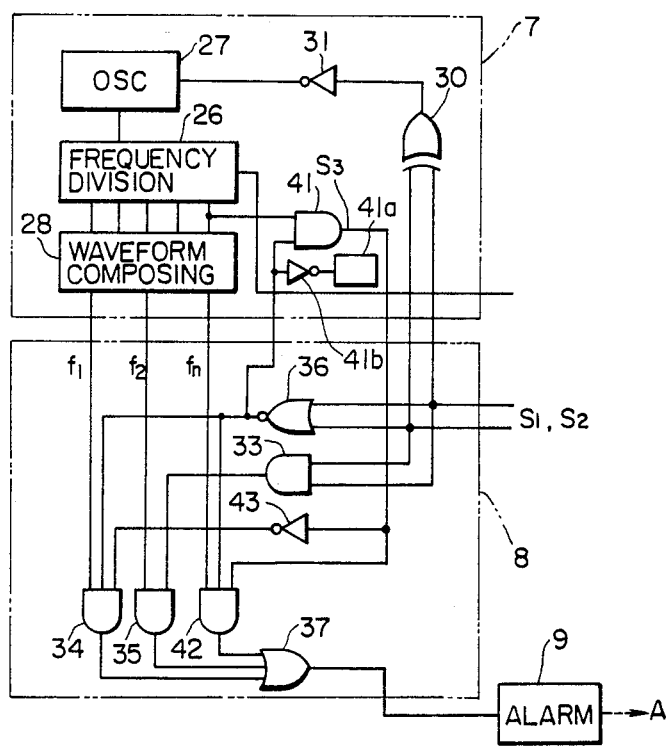
FIG. 4 is a circuit diagram showing another example of the oscillation frequency division circuit in FIG. 1 and a further example of the gate circuit in FIG. 1.

Another embodiment of the invention is shown in FIG. 4. In this embodiment, the warning sound A is generated for the time interval which elapses from the time instant when the negligence of wearing the seat belt is detected until a predetermined delay time $T_O$ passes, and thereafter a new and different warning sound A is intermittently generated. That is, initially, the alarm unit 9 generates the warning sound A at the frequency of a first waveform signal $f_1$ provided through an AND gate 34. After the lapse of the delay time $T_O$, an AND gate 41 in an oscillation frequency division circuit 7, receiving the last stage output of a frequency division circuit 26 and the "H" level output of a NOR gate 36, applies an "H" level timer signal $S_3$ to a latch circuit 41a which then supplies the timer signal $S_3$ to one input terminal of an AND gate 42 in a gate circuit 8. In this case, since the "H" level signals are applied to all of the input terminals of a 3-input AND gate 42, the latter 42 introduces a waveform signal $f_n$ from the waveform combining circuit 28 to the alarm unit 9. Therefore, after the delay time $T_O$, the alarm unit 9 generates a warning sound A intermittently at the frequency of the broken line in FIG. 2. Since the timer signal $S_3$, after being converted into an "L" level signal by an inverter 43, is applied to an AND gate 34, the output of the first waveform signal $f_1$ is positively stopped under this condition. The latch circuit will be cleared when the seat belt is buckled by an "H" level signal from inverter 41b. If preferred, the latch circuit could be connected instead between the inverter 43 and AND gate 34 so that the gate 34 would be held disabled but the gate 42 would only be intermittently enabled by the signal $S_3$.

Figure 5:
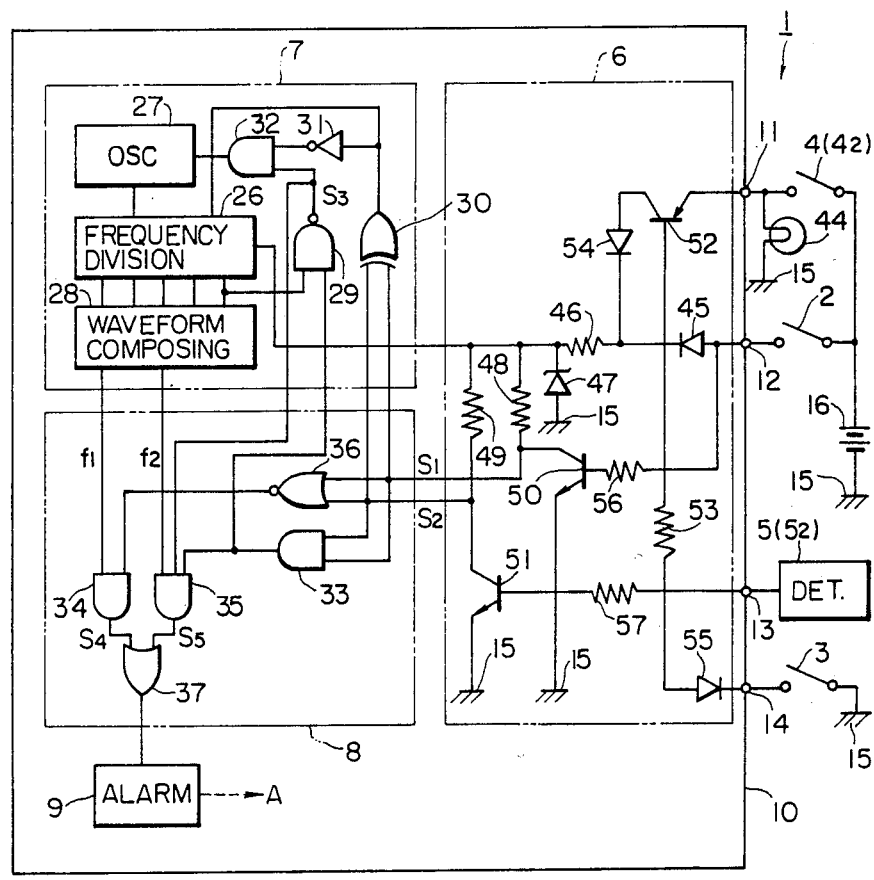
FIG. 5 is a circuit diagram showing another example of the warning signal generating device according to the invention.

Another embodiment of the invention is as shown in FIG. 5. In the warning signal generating device 1, a speed warning sound and a sound for warning of negligence in turning off a light on the vehicle are generated. A negligence preventing switch 4, which is a light switch $4_2$ in this case, is connected between an input terminal 11 and the positive terminal of an electric source 16. An illuminating light 44 is connected between an input terminal of the light switch $4_2$ and ground. A detecting means 5, which is a speed sensor in this case, is connected to an input terminal 13.

In a control circuit 6 of the warning signal generating device 1, a series circuit of a diode 45, a resistor 46 and a Zener diode 47 for constant voltage is connected between an input terminal 12 and ground. The cathode of the Zener diode 47 is connected through a resistor 48 to the collector of an NPN type transistor 50 the emitter of which is grounded. The cathode of the Zener diode 47 is further connected through a resistor 49 to the collector of an NPN type transistor 51 the emitter of which is grounded at 15. The bases of these transistors 50 and 51 are connected through resistors 56 and 57 to input terminals 12 and 13, respectively. The input terminal 11 is connected to the emitter of a transistor 52, the collector of which is connected through a diode 54 to the cathode of the diode 45. The base of the transistor 52 is connected through a resistor 53 and a diode 55 to an input terminal 14.

In this embodiment, an oscillation frequency division circuit 7 and a gate circuit 8 are essentially similar to those in FIG. 1 except that one input terminal of the NAND gate 29 for setting a delay time $T_O$ is connected to the output of the AND gate 33 instead of the output of the NOR gate 36.

The operation of the device thus organized will now be described.

When the vehicle is in operation, the ignition switch 2 is closed, and therefore power is supplied to the frequency division circuit 26 and a base current is supplied to the transistor 50 to render the latter 50 conductive (on). When, under this condition, the vehicle travellng speed reaches a predetermined value, the speed sensor $5_2$ provides an "H" level output which is applied to the transistor 51 to render the latter conductive (on). Thus, "L" level signals, i.e. first control signals $S_1$, are provided at the collectors of the transistors 50 and 51. Therefore, similarly as in the embodiment of FIG. 1, the alarm unit 9 continuously generates a warning sound A at the frequency of the first waveform signal $f_1$.

If the operator opens the door and leaves the vehicle, with the light 44 remaining on, then the light switch $4_2$ and the door switch 3 are closed. Therefore, a base current is applied to the transistor 52, and power is supplied to the frequency division circuit 26 by the electric source 16, although the ignition switch 2 is opened in this case. Under this condition, both the transistors 50 and 51 are in "off" states, and therefore the control circuit 6 provides "H" level signals, i.e. second control signals S₂, which are applied to the AND gate 33. Thus, the "H" level signals are applied to all of the input terminals of the AND gate 35. Therefore, the second waveform signal f₂ is introduced, as the second drive signal S₅, to the alarm unit 9, to drive the latter 9 at the frequency f₂. Since the "H" level output of the AND gate 33 is applied to one input terminal of the AND gate 29, similarly as in the above-described embodiment, the warning sound is automatically stopped after the predetermined delay time T$_O$.

In this embodiment, the warning sound is generated for a predetermined period of time to warn the operator of negligence in turning off the light; however, the device may be modified such that, in the case also where the vehicle speed reaches the predetermined value, the warning sound is generated for only a predetermined period of time. This can be readily achieved by applying the output of the NOR gate 29 to the AND gate 34. The alarm unit 9 may be a light emitting element instead of the sound generating element, or may be constituted by both a light emitting element and a sound generating element.

The control circuit 6, the oscillation frequency division circuit 7 and the gate circuit, have been disclosed by way of example only, and can be formed by other logical circuits if they perform the required functions.

The invention will provide the following excellent advantages:

Since the oscillation frequency division circuit is made up of the oscillator, the frequency division circuit and the waveform combining circuit, the output waveform signal frequencies can be selected as desired and are stable, and therefore the alarm sounds are also stable. These waveform signals can also be utilized for other additional devices. This is advantageous in the case where additional circuits are provided. I.e., since the waveform combining circuit produces several kinds of waveform signals from the frequency division output, one and the same unit can effectively produce different frequency warning signals for different warning conditions.

Since the circuit units, especially the oscillation frequency division circuit and the gate circuit, can be provided on one chip of integrated circuits, the warning signal generating device can be made small in size and can be manufactured at low cost. Since the oscillation frequency division circuit produces various signals on the time axis, timing control wherein the warning signal is produced for a predetermined period of time and is then stopped, or wherein the warning signal is changed after it is generated for a certain period of time, can be readily achieved by modifying the logical circuits.

In the case where the warning items are arranged in the order of priority, the warning signals may be produced in the order of priority by utilizing the outputs on the time axis of the frequency division circuit as outputs in time division mode.

What is claimed is:

1. A warning signal generating device for a vehicle of the type including a plurality of switch means for providing outputs indicating the status of respective vehicle components and means for generating a warning signal in response to abnormal combinations of indicated component status, said means for generating a warning signal comprising:
   control circuit means responsive to said switch means outputs for providing a first control signal in response to a first abnormal combination of said switch means outputs and a second control signal in response to a second abnormal combination of switch means outputs;
   alarm signal generating means responsive to said first control signal for providing an alarm drive signal of a first frequency and responsive to said second control signal for providing an alarm drive signal of a second frequency comprising;
   alarm means responsive to said alarm drive signals for providing different alarm indications in response to said two drive signals, said alarm signal generating means comprising; oscillation signal generating means responsive to either of said control signals for simultaneously generating said first and second frequency signals comprising; oscillator means responsive to either of said control signals for generating an oscillation signal, and means for including a frequency division means for receiving and frequency dividing said oscillation signal into a plurality of frequency divided signals, for deriving said first and second frequency signals from said oscillation signal; gate circuit means responsive to said first control signal for passing said first frequency signal to said alarm means and responsive to said second control signal for passing said second frequency signal to said alarm means; and
   wherein said oscillation signal generating means further comprises timing means responsive to an output from said frequency division means for terminating the generation of said first and second alarm drive signals after a predetermined period of time, said timing means including a counter for counting a timing signal derived from said oscillation signal.

2. A warning signal generating device as claimed in claim 1, wherein said oscillation signal generating means includes timing means for stopping the generation of said first and second frequency signals after a predetermined period of time.

3. A warning signal generating device as claimed in claim 1, wherein said means including a frequency division means further includes waveform composing means receiving said plurality of frequency divided signals from said frequency division means and generating said first and second frequency signals therefrom.

4. A warning signal generating device as claime in claim 1, wherein said gate circuit means comprises a first gate receiving said first frequency signal and enabled by said first control signal, and a second gate receiving said second frequency signal and enabled by said second control signal.

5. A warning signal generating device as claimed in claim 1, wherein said timing means disables said oscillator means after said predetermined peiod of time.

6. A warning signal generating device as claimed in claim 1, wherein said timing means disables said gate circuit means.

7. A warning signal generating device as claimed in claim 1, wherein said means including a frequency division means further comprises waveform composing means for generating a plurality of waveform signals, including said first and second frequency signals, from said frequency divided outputs, said timing signal comprising one of said plurality of waveform signals.

8. A warning signal generating device as claimed in claim 1, wherein said plurality of switch means includes an ignition switch, a door switch, a negligence detecting switch and at least one other switch switchable between normal and abnormal states, said control circuit means providing said first control signal when said ignition switch is on and said one other switch is in its abnormal state and providing said second signal when said ignition switch is off and said negligence detecting switch is in a predetermined state.

9. A warning signal generating device as claimed in claim 1, wherein said oscillation signal generating means generates a third frequency signal ($f_n$) and said gate circuit means passes said first frequency signal for a predetermined period of time in response to said first control signal and after said predetermined period of time intermittently passes said third frequency signal.

10. A warning signal generating device for a vehicle, comprising:
- an ignition switch which is turned on when the engine key of said vehicle is turned on;
- a door switch for detecting whether or not a vehicle door is open;
- a negligence preventing switch for detecting whether or not a vehicle component is in a satisfactory state;
- detecting means for detecting whether or not an object to be detected is in a normal state when said ignition switch is turned on;
- a control circuit for producing a first control signal when said ignition switch is turned on and said detecting means detects that said object to be detected is in an abnormal state, and a second control signal when said door switch detects that said vehicle door is open and said negligence preventing switch detects negligence in properly operating said vehicle component;
- an oscillation frequency division circuit for producing first and second waveform signals from respective frequency division stages and a timer signal in a predetermined period of time;
- a gate circuit for supplying a first drive signal which is obtained by combining said first control signal and said first waveform signal, and a second drive signal which is obtained by combining said second control signal and said second waveform signal, for a predetermined delay time with the aid of said timer signal;
- an alarm unit which is driven in one warning state by said first drive signal and in another warning state by said second drive signal; and
- said oscillation frequency division circuit including timer signal generating means receiving a signal for a timer signal generation and an output from said gate circuit, said timer signal generating means being operable to prevent the generation of said timer signal when said first control signal is applied to said gate circuit and to allow the generation of said timer signal when said second control signal is applied to said gate circut, and said first drive signal being only controlled by said timer signal after a predetermined period of time elapses from the generation of said first drive signal.

11. A device as claimed in claim 10, wherein said negligence preventing switch is a key switch which is closed when said engine key is inserted, and said detecting means is a seat belt switch which is closed when a seat belt is not used.

12. A device as claimed in claim 10, wherein said negligence preventing switch is a light switch which is used to turn on an illuminating light, and said detecting means is a speed sensor which is operated when said vehicle runs at a predetermined speed or higher.

* * * * *